(12) United States Patent
Kim (10) Patent No.: US 8,893,175 B2
(45) Date of Patent: Nov. 18, 2014

(54) SYSTEM AND METHOD OF BROADCASTING PAY-PER-VIEW CONTENTS

(75) Inventor: Ki Yeon Kim, Seoul (KR)

(73) Assignee: Ki Yeon Kim, Seoul (KR)

( * ) Notice: Subject to any disclaimer, the term of this patent is extended or adjusted under 35 U.S.C. 154(b) by 0 days.

(21) Appl. No.: 13/540,470

(22) Filed: Jul. 2, 2012

(65) Prior Publication Data

US 2013/0117783 A1 May 9, 2013

Related U.S. Application Data

(63) Continuation of application No. PCT/KR2010/009570, filed on Dec. 30, 2010.

(30) Foreign Application Priority Data

Dec. 31, 2009 (KR) .................. 10-2009-0136270

(51) Int. Cl.

| H04N 7/10 | (2006.01) |
|---|---|
| H04N 7/025 | (2006.01) |
| H04N 7/16 | (2011.01) |
| H04N 7/173 | (2011.01) |
| G06Q 30/00 | (2012.01) |
| H04N 21/6547 | (2011.01) |
| H04N 21/431 | (2011.01) |
| H04N 21/81 | (2011.01) |
| H04N 21/472 | (2011.01) |
| H04N 21/237 | (2011.01) |
| H04N 21/2543 | (2011.01) |
| H04N 21/258 | (2011.01) |

(52) U.S. Cl.
CPC ......... *H04N 21/812* (2013.01); *H04N 21/6547* (2013.01); *H04N 21/4316* (2013.01); *H04N 21/47202* (2013.01); *H04N 21/237* (2013.01); *H04N 21/25435* (2013.01); *H04N 21/47211* (2013.01); *H04N 21/25875* (2013.01)
USPC .............. 725/34; 725/8; 725/113; 705/14.48

(58) Field of Classification Search
None
See application file for complete search history.

(56) References Cited

U.S. PATENT DOCUMENTS

| 2003/0056219 A1* | 3/2003 | Reichardt et al. ............... 725/60 |
| 2003/0149574 A1* | 8/2003 | Rudman ........................... 705/1 |
| 2003/0149618 A1* | 8/2003 | Sender et al. .................... 705/14 |
| 2007/0283384 A1* | 12/2007 | Haeuser et al. ................. 725/34 |
| 2008/0046919 A1* | 2/2008 | Carmi et al. .................... 725/32 |

FOREIGN PATENT DOCUMENTS

| KR | 10-2008-0065589 A | 7/2008 |
| KR | 10-2008-0090165 A | 10/2008 |
| KR | 10-2009-0051523 A | 5/2009 |

* cited by examiner

*Primary Examiner* — Nathan Flynn
*Assistant Examiner* — William J Kim
(74) *Attorney, Agent, or Firm* — Edwards Wildman Palmer LLP; Kongsik Kim (57) ABSTRACT

Disclosed is a system and method in which, when a customer to view pay-per-view broadcasting contents over an Internet protocol television (IPTV) or a personal computer (PC) consents to advertisement reception, a broadcasting service provider receives money from an advertiser that has previously agreed to pay advertising costs without receiving a subscription fee from the customer, transmits the pay-per-view contents to the customer, and applies screen-splitting technology at certain intervals to generate a split screen irrespective of main broadcasting contents.

4 Claims, 5 Drawing Sheets

SYSTEM AND METHOD OF BROADCASTING PAY-PER-VIEW CONTENTS

CROSS REFERENCE TO RELATED APPLICATION

This application is a continuation of International Patent Application No. PCT/KR2010/009570 filed Dec. 30, 2010, which claims the benefit of Korean Patent Application No. 10-2009-0136270 filed Dec. 31, 2009, which applications are incorporated herein by reference.

TECHNICAL FIELD

The present invention relates to a system and method in which, when a customer to view pay-per-view broadcasting contents over an Internet protocol television (IPTV) or a personal computer (PC) consents to advertisement reception, a broadcasting service provider receives money from an advertiser that has previously agreed to pay advertising costs without receiving a subscription fee from the customer, transmits the pay-per-view contents to the customer, and applies screen-splitting technology at certain intervals to generate a split screen irrespective of main broadcasting contents, and provides the advertising contents of the advertiser.

BACKGROUND

In a conventional video-on demand (VOD) service of IPTVs or PCs, advertisements are displayed before the consumer/user is providing with their subscribed main contents, or contents are divided into a plurality of sessions and contents of an advertiser are displayed each time a sessions ends. As a result, a broadcasting provider that is a content provider receives a profit or payment from the advertiser each time the advertiser's content is shown to the consumer/user.

According to recent trends, IPTVs are becoming commonplace, and users receive and view various broadcasting contents through a PC over the Internet. However, the video content service of IPTVs or Internet PCs is generalized as a pay service, and thus, customers that are viewers actually avoid receiving pay-per-view broadcasting contents. In other words, all customers using the IPTV service desire to use a pay-broadcasting service at lower charges or at no charge at all.

Therefore, broadcasting content providers that reflect the demands of customers and provide pay-per-view broadcasting contents over the Internet or pay-per-view broadcasting content providers, such as KT, SK Broadband, LG Dacom and the like that provide broadcasting contents in Korea for example, require a differentiated service for making an additional profit for the IPTV businesses without burdening customers.

Moreover, in terms of advertisers, it is necessary to create an advertisement model for maximizing the effect advertisements have on customers that use the VOD service or the IPTV service over the Internet, and particularly, it is also necessary to create a profit model that provides advertisements at a low cost and moreover increases direct sales. In particular, under the current broadcasting law in Korea, realtime broadcasting that is provided through cable TVs or Skylife cannot provide subtitled advertisements. However, in VOD broadcasting contents using PCs on the Internet or VOD broadcasting contents of the IPTV service, advertisements can be provided regardless of whether contents are free or not.

In this context, an advertisement service affiliated with this can become the optimal background for advertisers in using the advertisement service.

The present invention provides a broadcasting service system and method which proposes a new profit generation model to a broadcasting content provider through an IPTV or a PC over the Internet, provides a source for providing advertising contents affiliated with a broadcasting content service to an advertiser, and enables a customer to view pay-per-view broadcasting contents for free, thus satisfying all parties.

The present invention also provides an affiliated broadcasting service which splits an entire screen of a customer terminal using screen-splitting technology to receive broadcasting contents, periodically exposes advertising contents of an advertiser, and thus increases an advertisement effect given to a customer that is focusing on the broadcasting contents.

The present invention also provides a broadcasting service which enables a broadcasting content provider to provide an advertisement customized to a target customer, which is preferred by advertisers in general.

In an aspect of the present invention, a broadcasting service method and system, which provides free broadcasting contents according to a viewer's consent to advertisements using an advertiser terminal, an advertisement management server, a broadcasting management server, and a customer terminal which are connected to each other over a wired and wireless network, includes the steps of: (a) performing, by the advertisement management server, user authentication and providing an user interface for managing advertising contents to a plurality of advertisers when the advertiser terminal accesses the advertisement management server; (b) performing, by the broadcasting management server, user authentication of the customer terminal and asking whether the user consents to exposure of advertising contents when the customer terminal requests transmission of broadcasting contents from the broadcasting management server; (c) transmitting and installing, by the broadcasting management server, a control module which controls a multi-screen of the customer terminal when the customer terminal (through user selection) consents to the advertising contents; (d) transmitting, by the broadcasting management server, predetermined screen split setting information to the customer terminal; (e) transmitting, by the broadcasting management server, the broadcasting contents free to the customer terminal; (f) selecting, by the advertisement management server, an advertiser with an IP address as a target by using the IP address in customer information of the customer terminal, and transmitting advertising contents of the selected advertiser to the customer terminal; and (g) analyzing, by the control module installed in the customer terminal, the screen split setting information to split an entire screen of the customer terminal into a main screen and a sub-screen, and reproducing broadcasting contents on the main screen and simultaneously reproducing advertising contents on the sub-screen.

Step (a) may include the steps of: (a-1) performing, by the advertisement management server, user authentication when the advertiser terminal requests registration of advertising contents in the advertisement management server; (a-2) performing, by the advertisement management server, the user authentication and providing the user interface for managing the advertising contents to register and update basic information of the advertiser, target customer information on a customer which desires an advertisement, and advertising contents information suitable for an advertising content type; and (a-3) generating, by the advertisement management server, an advertisement management table database on the basis of the updated information.

Step (f) may include the steps of: (f-1) receiving, by the broadcasting management server, customer information of the customer terminal and transmitting the customer information to the advertisement management server when the customer terminal consents to the advertising contents; (f-2) selecting, by the advertisement management server, an advertiser with an IP address of the customer terminal as a target from the customer information on the basis of the advertisement management table database; and (f-3) transmitting advertising contents of the selected advertiser to a target customer terminal.

Step (g) may include the steps of: (g-1) analyzing, by the control module, values associated with a type of an entire screen, a reproduction time and period of a sub-screen for driving advertising contents, a driving player based on a type of advertising contents added into the sub-screen, and a storage path of advertising contents which are designated in the screen split setting information; and (g-2) fetching advertising contents in a real-time streaming type through the storage path, and reproducing the fetched advertising contents on the sub-screen.

The broadcasting service method may further include the steps of: (i) receiving, by the advertisement management server, information on how many times advertising contents has been exposed to the customer terminal from the broadcasting management server, and calculating predetermined advertising costs and transaction fee in accumulated money of an advertiser in proportion to the number of exposures; (j) generating and storing a database of the calculated advertising costs and transaction fee information; and (k) restricting, by the advertisement management server, advertisement exposure when the accumulated money of the advertiser is insufficient.

The broadcasting service method may further include the steps of: (i) requesting advertiser information from the broadcasting management server when advertising contents reproduced by the customer terminal is selected; (m) retransmitting, by the broadcasting management server, the predetermined screen split setting information to the customer terminal; (n) analyzing, by the control module installed in the customer terminal, the retransmitted screen split setting information to re-split the entire screen of the customer terminal into a main screen and a sub-screen; and (o) providing, by the advertisement management server, an advertisement information list screen user interface to the re-split sub-screen, the advertisement information list screen user interface including advertising contents, information on an order method, information on a reservation method, or information on a payment method that will be displayed by the customer terminal.

Step (n) may include the steps of: (n-1) analyzing, by the control module, values associated with a type of an entire screen, a reproduction time and period of a sub-screen for driving advertising contents, a driving player based on a type of advertising contents added into the sub-screen, and a storage path of advertising contents which are designated in the retransmitted screen split setting information; and (n-2) fetching advertising contents in a real-time streaming type through the storage path, and reproducing the fetched advertising contents on the sub-screen.

The broadcasting service method that provides pay-per-view broadcasting contents at no charge according to a viewer's consent to advertisements can achieve the following effects.

First, the present invention simultaneously displays advertising contents of an advertiser in the lower and upper portions and/or left and right portions of a screen without a damage due to overlapping with broadcasting contents (hereinafter "the main contents") through a screen splitting method such that image reproduction is not cut off while providing the broadcasting contents from the first portion to the final portion through a main screen according to a customer terminal's consent to advertisements, and thus enables the customer to continuously view the broadcasting contents and simultaneously display advertisements (banners, subtitles, videos, etc.). Accordingly, the present invention proposes a new profit generation model to a broadcasting content provider through an IPTV or a PC over the Internet, provides a source for providing advertising contents affiliated with a broadcasting content service to an advertiser, and enables a customer to view pay-per-view broadcasting contents for free, thus satisfying all parties.

Second, according to the present invention, when broadcasting contents are fully reproduced on the entire screen of the customer terminal and a screen is split, a main screen is reduced to a size less than that of the original image screen for full screen contents, and contents of an advertiser are displayed on a plurality of split sub-screens. Thus, subtitles are continuously shown because the original image is not covered. Accordingly, the customer's viewing ability is not hindered, and advertising contents on the split sub-screens are displayed to the customer at while the user watches the main content, and thus the present invention can increase the effect an advertisement has on a customer watching the main content.

Third, according to the present invention, a broadcasting content provider compares information (e.g., address, age, sex, etc.) of customers who have been registered in an advertisement management server with data that advertisers have preregistered with regard to target customers for advertisements to thereby select matching advertisers and select the selected advertiser as an advertiser for a split screen, and by transmitting broadcasting contents and advertising contents to a customer terminal together with screen split setting information, the advertiser can provide an advertisement customized to a target customer.

DESCRIPTION OF MAJOR SYMBOL IN THE FIGURES

100: head-end system 120: advertisement management server
121: user interface 122: advertisement management table database
123: broadcasting content database 124: advertisement-related module 125: order-related module 140: broadcasting management server
141: user interface 142: control module
143: user (advertiser/customer) database 144: broadcasting content database
145: screen split setting information database
200: advertiser terminal 300: customer terminal

DETAILED DESCRIPTION OF THE DISCLOSURE

The present invention will be described more fully hereinafter with reference to the accompanying drawings, in which exemplary embodiments of the invention are shown.

Furthermore, the control logic of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a server or a network.

According to the present invention, a broadcasting service system and method, which provides broadcasting contents for free upon a viewer's consent to advertisements using an advertiser terminal, an advertisement management server, a broadcasting management server, and a customer terminal which are connected to each other over a wired or wireless network, includes: (a) performing, by the advertisement management server, user authentication and providing a user interface for managing advertising contents to a plurality of advertisers when the advertiser terminal accesses the advertisement management server; (b) performing, by the broadcasting management server, user authentication of the customer terminal and requesting consent to advertising contents when the customer terminal requests transmission of broadcasting contents from the broadcasting management server; (c) transmitting and installing, by the broadcasting management server, a control module which controls a multi-screen of the customer terminal when the customer terminal consents to the advertising contents; (d) transmitting, by the broadcasting management server, predetermined screen split setting information to the customer terminal; (e) transmitting, by the broadcasting management server, the broadcasting contents for free to the customer terminal; (f) selecting, by the advertisement management server, an advertiser with an IP address as a target using the IP address in customer information on the customer terminal, and transmitting advertising contents of the selected advertiser to the customer terminal; and (g) analyzing, by the control module installed in the customer terminal, the screen split setting information to split an entire screen of the customer terminal into a main screen and a sub-screen, and reproducing broadcasting contents on the main screen and simultaneously reproducing advertising contents on the sub-screen.

Hereinafter, a broadcasting service system and method of providing pay-per-view broadcasting contents for free according to a viewer's consent to advertisements according to an embodiment of the present invention will be described in detail with reference to the accompanying drawings.

Figure 1:
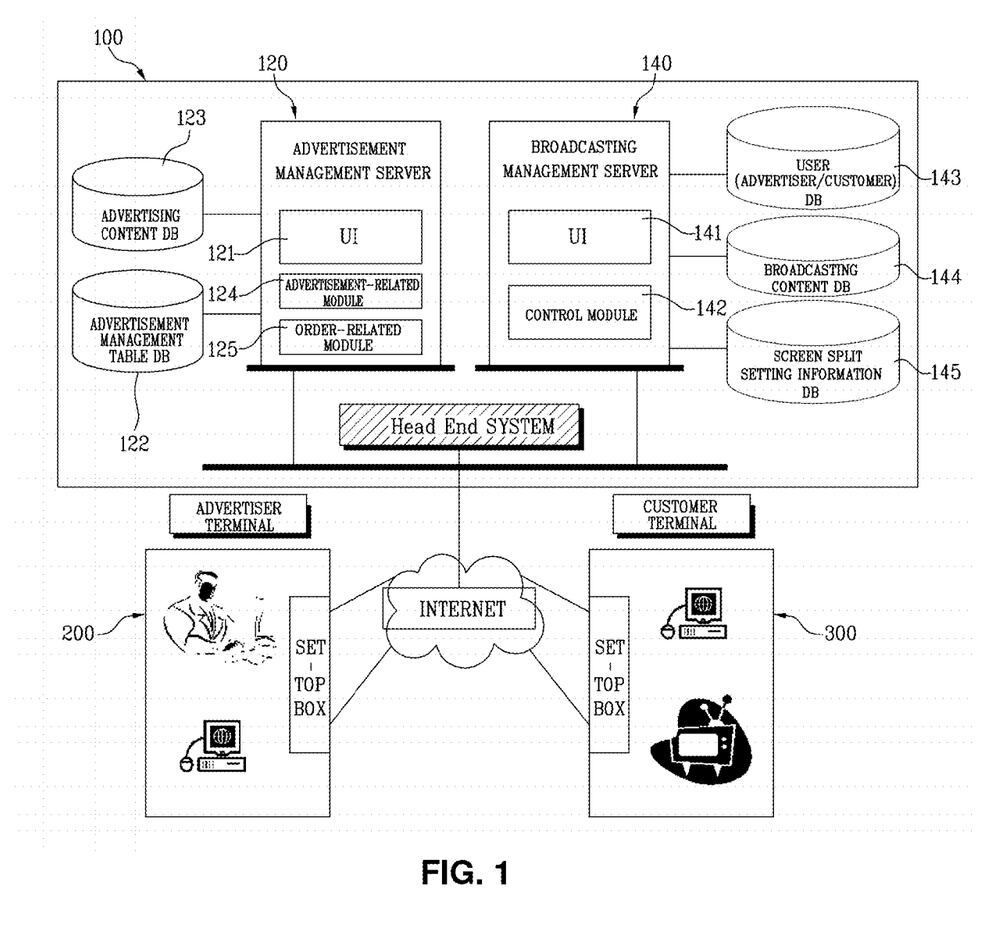
FIG. 1 is a block diagram illustrating a broadcasting service system according to an exemplary embodiment of the present invention.

FIG. 1 is a block diagram illustrating a broadcasting service system according to an embodiment of the present invention. Referring to FIG. 1, the broadcasting service system of the present invention includes a head-end system 100 of a broadcasting content provider that includes an advertisement management server 120 and a broadcasting management server 140, an advertiser terminal 200 of an advertiser that includes a set-top box and provides advertising contents, and a customer terminal 300 of a service subscriber that includes a set-top box. Here, the head-end system 100, the advertiser terminal 200, and the customer terminal 300 are connected to each other over a network (wired or wireless).

The advertisement management server 120 provides a user interface (UI) 121 to the advertiser terminal 200 to allow the UI 121 to generate and store an advertisement management table database (DB) 122. The UI 121 registers, updates, and manages basic information of advertisers that have applied for a plurality of advertisements, target customer information (address, age, sex, etc.) on customers to which the advertisers desire to provide advertisements, selection of advertising content types (advertisement-type banners, subtitles, images, etc.), and advertising contents suitable for each of the advertising content types. Therefore, the advertisement management server 120 includes a broadcasting content database 123 that stores advertising contents registered through the advertiser terminal 200.

Moreover, the advertisement management server 120 includes an advertisement-related module 124. The advertisement-related module 124 organizes advertising contents (which have been registered through the user interface 120) to be transmitted on a specific date or within a specific period, pre-designates the number of times advertising contents are displayed to the same customer such that advertising contents are transmitted several times or without limitation, and generates and manages an information database for payment information of advertisement costs, balance information on an advertising sum, and advertisement exposure for a certain duration.

When the advertisement-related module 124 receives information indicating how many times an advertisement of an advertiser has been exposed from the broadcasting management server 140, the advertisement-related module 124 automatically subtracts predetermined advertising costs from an advertising sum (which has been previously accumulated by an advertiser) according to the number of exposures, thereby calculating the advertising costs. Also, when the balance of the accumulated advertising sum is insufficient, the advertisement-related module 124 performs control to restrict the exposures of advertisements.

When an advertisement displayed on the screen of the customer terminal 300 is clicked by, e.g., a mouse or selected by a remote controller, an order-related module 125 included in the advertisement management server 120 performs control to provide the advertisement information list screen user interface 121 embodied as a customer management screen including information (type, price, etc.) of the contents, information on the order method, and information on a payment method that will be displayed by the customer terminal 300, and to provide basic information to the customer, order information, and information on an advertisement exposure result as a screen to the advertiser terminal 200. When the purchase order of the customer terminal 300 has been received, the order-related module 125 transmits information on the order received by an advertiser to the customer terminal 300 in an instant message type. In other words, when the customer selects a purchase order, a delivery request, a payment, etc. using the advertisement information list screen user interface 121, the order-related module 125 reflects the selected information, and when the advertiser sends an instant message to the customer terminal 300 using the advertiser terminal 200, the order-related module 125 relays the instant message.

The broadcasting management server 140 includes a broadcasting content database 144, and when the advertiser terminal 200 accesses the advertisement management server 120 or the customer terminal 300 requests transmission of pay-per-view broadcasting contents, the broadcasting management server 140 performs an authentication using a user (advertiser/customer) database 143.

Moreover, when the customer terminal 300 consents to advertisement reception through the user interface 141, the broadcasting management server 140 compares customer information with target customer information of advertisers in an advertisement management table database 122 that has been previously generated by the advertisement management server 120, thereby selecting a suitable advertiser.

Moreover, when the customer terminal 300 consents to advertisement reception from a screen split setting information database 145, the broadcasting management server 140 generates screen split setting information (screen split type information such as a left banner and subtitles, information such as a lower banner and subtitles, display continuation information, etc.), and thus, when the customer terminal 300 consents to advertisement reception, the broadcasting management server 140 transmits the screen split setting information to the customer terminal 300, thereby enabling the display of a screen split type. Therefore, the customer terminal 300 receives broadcasting contents and advertising contents of the advertiser to analyze the screen split setting information, and thus prepares to reproduce broadcasting contents on a split main screen and simultaneously reproduce broadcasting contents on at least one split sub-screen.

However, when the screen split setting information does not include advertising contents that will be displayed on a predetermined split screen, the broadcasting management server 140 may cause a split screen not to be formed. This is because if a screen is split when there are no advertising contents, the split screen is displayed as an empty space.

When pay-per-view broadcasting contents provided from the broadcasting management server 140 are selected and advertisements are consented to by selecting advertisement reception in response to a request that verifies advertisement consent, the customer terminal 300 receives pay-per-view broadcasting contents and screen split setting information from the broadcasting management server 140, and receives advertising contents of an advertiser from the advertisement management server 120. Moreover, the customer terminal 300 receives a control module 142 from the broadcasting management server 140 to analyze the screen split setting information, and reproduces pay-per-view broadcasting contents and advertising contents on respective split screens.

Here, the control module 142 transmitted to the customer terminal 300 is installed in the customer terminal 300. The control module 142 analyzes the screen split setting information received from the broadcasting management server 140, and controls the customer terminal 300 according to the screen split setting information, thereby reproducing the broadcasting contents and the advertising contents on the respective split screens.

In detail, in illustrative embodiment of the present invention, a server-based multi-player algorithm that is applied according to one screen being split into two or more screens requires an independent player that drives data for each screen which is split according to one screen being split into two or more screens, unlike the existing single player configuration. Since paths for fetching a data type (video, image, text) to be realized on each screen, a reproduction time, and contents may differ, each player is required to be independently operated, and a module for overall management is required in order for all split screens to be harmoniously formed as one multi-screen. The module may be the control module 142. However, in the customer terminal 300 in which the control module 142 has been already installed, it is understood by those skilled in the art that the above-described procedure may be omitted.

Moreover, the control module 142 analyzes values associated with the type of an entire screen, a reproduction time/period of a sub-screen for driving advertising contents, a driving player based on the type of advertising contents added into the sub-screen, and a storage path of advertising contents that are designated in the screen split setting information. The control module 142 fetches advertising contents in a real-time streaming operation through the storage path, and performs control to reproduce the advertising contents on the sub-screen. In further detail, the control module 142 allows broadcasting contents and advertising contents to be realized on a multi-screen according to a database (DB) design algorithm such as Extensible Markup Language (XML).

As a result, when broadcasting contents are fully reproduced on the entire screen of the customer terminal 300 and then a screen is split, a main screen is reduced to a size less than that of the original image screen for full screen contents, and contents of an advertiser are displayed on a plurality of split sub-screens. Thus subtitles are continuously shown because the original image is not covered by the advertisement. Accordingly, the customer is not inconvenienced by the above system and method, and advertising contents on the split sub-screens are suddenly projected to the customer. Thus, the effect an advertisement has on a customer watching the advertisement is increased.

Moreover, when a screen is split while broadcasting contents are reproduced on a main screen by the customer terminal 300 and thus advertising contents are exposed on a sub-screen, when the customer selects advertising contents (using a remote controller in an IPTV, and using a click by a mouse in a PC), the main screen is reduced, and the advertisement information list screen user interface 121 that an advertiser has previously provided through the advertisement management server 120 is shown in the left/right or upper/lower space of the main screen. Accordingly, the customer may perform an order, a payment, and a delivery request while viewing the broadcasting contents through the advertisement information list screen user interface 121.

Moreover, the advertiser generates an instant message, such as "Your order has been received," or "The product you ordered has been shipped," based on the order information that has been received from the customer terminal 300 and sends the instant message using the advertiser terminal 200. Then the instant message may be displayed by the customer terminal 300.

Hereinafter, a process in a broadcasting service method of providing pay-per-view broadcasting contents for free according to a viewer's consent to advertisements according to an embodiment of the present invention will be described in further detail.

Figure 2:
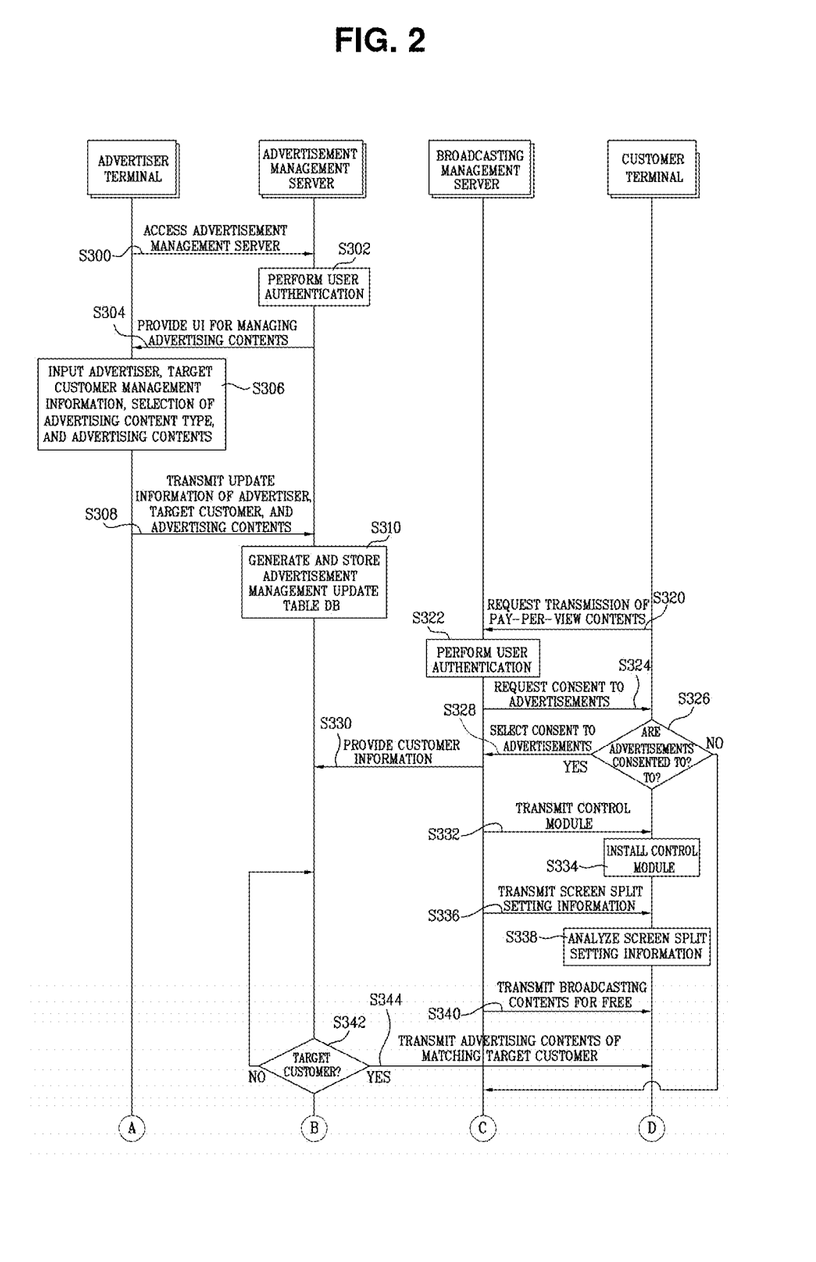
FIG. 2 is a flowchart illustrating a broadcasting service method which provides broadcasting contents for free according to a viewer's consent to advertisements according to an exemplary embodiment of the present invention.
Figure 3:
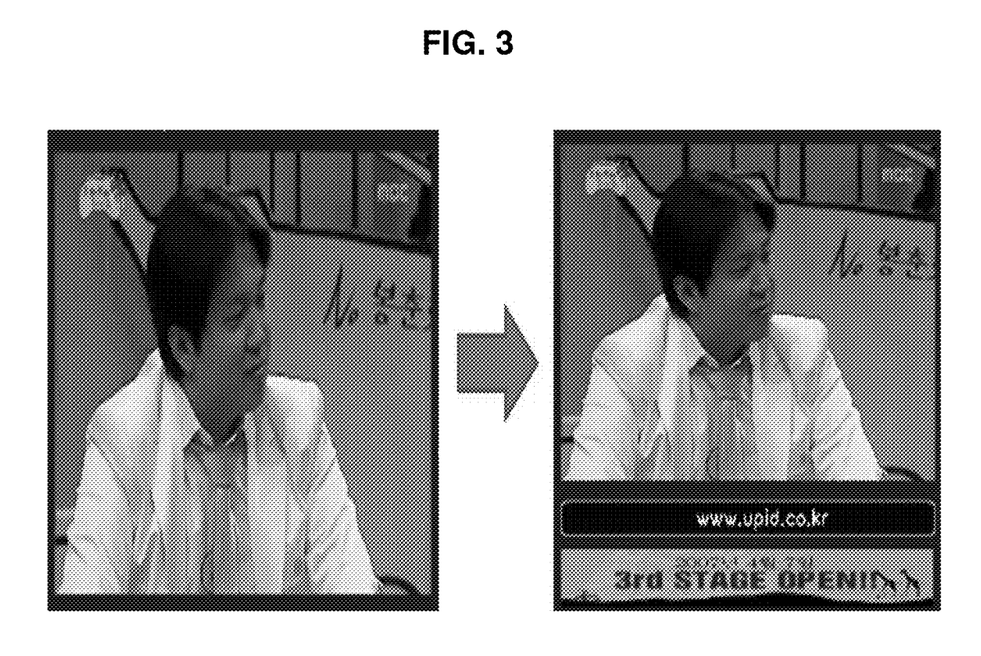
FIG. 3 is a state diagram showing an advertisement exposure state according to an embodiment of the present invention.
Figure 4:
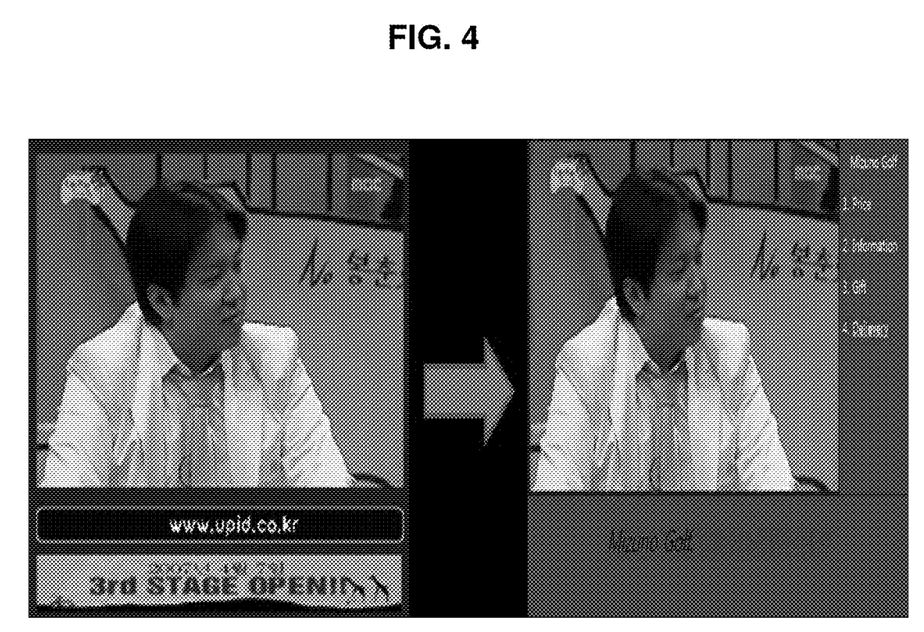
FIG. 4 is a state diagram showing a state in which an advertisement information list screen user interface (UT) is provided when an advertisement is selected in an advertisement exposure state according to an exemplary embodiment of the present invention.

FIG. 2 is a flowchart illustrating a broadcasting service method of provides broadcasting contents for free according to a viewer's consent to advertisements according to an exemplary embodiment of the present invention. FIG. 3 is a state diagram showing an advertisement exposure state according to an embodiment of the present invention. FIG. 4 is a state diagram showing a state in which an advertisement information list screen user interface (UI) is provided when an advertisement is selected in an advertisement exposure state according to an exemplary embodiment of the present invention.

When the advertiser terminal 200 accesses the advertisement management server 120 in operation S300, the advertisement management server 120 performs user authentication in operation S302, and then provides the user interface 121 for managing advertising contents to a plurality of advertisers in operation S304. That is, the advertisement management server 120 provides the user interface 121 for managing advertising contents to the advertiser terminal 200, and thus receives, registers/updates, and manages basic information of advertisers, target customer information on customers that desire advertisements, and advertising content information suitable for an advertising content type in operation S306.

When the advertiser terminal 200 transmits registered/updated information on advertisers, target customers, and advertising contents to the advertisement management server 120 in operation S308, the advertisement management server 120 generates an advertisement management table database on the basis of the updated information in operation S310.

Next, when the customer terminal 300 requests broadcasting contents from the broadcasting management server 140 in operation S320, the broadcasting management server 140 performs the user authentication of the customer terminal 300 in operation S322. Subsequently, when the authentication is successful, the broadcasting management server 140 requests consent to advertising contents through the user interface 141 in operation S324.

When the customer terminal 300 consents in response to the request for consent to the advertising contents (S326) through the user interface 141 in operation S328, the broadcasting management server 140 provides customer information to the advertisement management server 120 in operation S330, and moreover provides the control module 142, which controls the multi-screen of the customer terminal 300, to the customer terminal 300 in operation S332.

The control module 142 may be installed in the customer terminal 300 in operation S334, and then the broadcasting management server 140 transmits predetermined screen split setting information to the customer terminal 300 in operation S336. The control module 142 may then analyze the screen split setting information in operation S338, and the broadcasting management server 140 transmits broadcasting contents to the customer terminal 300 at no charge in operation S340.

Moreover, the advertisement management server 120 receiving customer information selects a matching advertiser with an Internet protocol (IP) address of the customer terminal 300 as a target using the IP address to determine whether the customer is a target customer of the advertiser in operation S342, and transmits advertising contents of the selected advertiser to the customer terminal 300 in operation S344.

In further detail, the advertisement-related module 124 of the advertisement management server 120 receiving the customer information selects an advertiser matching the IP address of the customer terminal 300 from an advertisement management table database on the basis of the customer information, and transmits advertising contents of the selected advertiser to the customer terminal 300 that desires the advertising contents.

Referring to FIG. 3, the customer terminal 300 receives broadcasting contents and advertising contents in operation S346. The control module 142 installed in the customer terminal 300 analyzes the screen split setting information to split the entire screen of the customer terminal 300 into a main screen and a sub-screen, and starts to reproduce the broadcasting contents on the main screen and simultaneously reproduce the exposed advertising contents on the sub-screen in operation S348.

The broadcasting contents or the advertising contents of the advertiser may be configured as advertising contents specialized for the targeted customer terminal 300. For example, general IPTV broadcasting contents may be reproduced on a main screen, and self-publicized advertising contents of a customer may be simultaneously reproduced on a sub-screen. Alternatively, franchise Closed User Group (CUG) broadcasting may be configured so that broadcasting contents operated by a head office are reproduced on the main screen, and self-publicized advertising contents operated by each franchise are simultaneously reproduced on the sub-screen. That is, a broadcasting content provider proposes a broadcasting service that is configured in order for advertisers to provide a customized advertisement to a desired target customer.

When the customer terminal 300 does not consent in response to the request for consent to the advertising contents (S326) through the user interface 141, the customer terminal 300 receives (S382) pay-per-view broadcasting contents by authenticating payment in operation S350.

Subsequently, the advertisement-related module 124 of the advertisement management server 120 receives information indicating how many times advertising contents have been exposed on the customer terminal 300 from the broadcasting management server 140, and calculates predetermined advertising costs and transaction fees in accumulated money of an advertiser in proportion to the number of exposures in operation S352. The advertisement-related module 124 generates and stores a database of the calculated advertising cost and transaction fee information in operation S354. At this point, when the accumulated money of the advertiser is insufficient, the advertisement-related module 124 of the advertisement management server 120 may be programmed to restrict the exposures of advertisements.

Subsequently, when advertising contents reproduced by the customer terminal 300 are selected (using a remote controller in an IPTV, or using a click by a mouse in a PC) in operation S356, the customer terminal 300 requests advertiser information from the broadcasting management server 140 in operation S358, and the broadcasting management server 140 retransmits predetermined screen split setting information to the customer terminal 300 in operation S360.

At this point, the control module installed in the customer terminal 300 analyzes the retransmitted screen split setting information in operation S362, and re-splits the entire screen of the customer terminal 300 into a main screen and a sub-screen (see FIG. 4). The order-related module 125 of the advertisement management server 120 provides the advertisement information list screen user interface 121 that includes advertising contents, information on an order method, information on a reservation method, or information on a payment method that will be displayed on the re-split sub-screen in operation S364, and broadcasting contents are continuously reproduced on the main screen in operation S366.

Subsequently, when the customer terminal 300 transfers an order/reservation request to the advertisement management server 120 through the advertisement information list screen user interface 121 according to whether there is an order (S368) in operation S370, the order-related module 125 of the advertisement management server 120 generates and stores order-related information in operation S372, and provides an order-related information screen to the advertiser terminal 200 in operation S374.

Moreover, when the advertiser terminal 200 has received the purchase order of the customer terminal 300, the order-related module 125 of the advertisement management server 120 performs control such that order reception information of the advertiser is transmitted to the customer terminal 300 in an instant message type in operations S376 and S378.

In other words, when the customer selects a purchase order, a delivery request, or payment using the advertisement information list screen user interface 121, the order-related module 125 of the advertisement management server 120 reflects the selected information, and when the advertiser sends an instant message to the customer terminal 300 using the advertiser terminal 200, the order-related module 125 relays the instant message. Therefore, the customer terminal 300 receives the instant message in operation S380.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

The present invention relates to a system and method in which, when a customer to view pay-per-view broadcasting contents over an Internet protocol television (IPTV) or a personal computer (PC) consents to advertisement reception, a broadcasting service provider receives money from an advertiser that has previously agreed to pay advertising costs without receiving a subscription fee from the customer, transmits the pay-per-view contents to the customer, and applies screen-splitting technology at certain intervals to generate a split screen irrespective of main broadcasting contents, and provides advertising contents of the advertiser, and which has high industrial availability.

The invention claimed is:

1. A broadcasting service method of providing broadcasting contents for free according to a viewer's consent to advertisements using an advertiser terminal, an advertisement management server, a broadcasting management server, and a customer terminal which are connected to each other over a wired or wireless network, the broadcasting service method comprising the steps of:
   (a) performing, by the advertisement management server, user authentication and providing a user interface for managing advertising contents to a plurality of advertisers when the advertiser terminal accesses the advertisement management server, wherein step (a) comprises the steps of:
   (a-1) performing, by the advertisement management server, user authentication when the advertiser terminal requests registration of advertising contents in the advertisement management server;
   (a-2) performing, by the advertisement management server, the user authentication and providing the user interface for managing the advertising contents to register and update basic information of the advertiser, target customer information on a customer who desires an advertisement, and advertising content information suitable for an advertising content type; and
   (a-3) generating, by the advertisement management server, an advertisement management table database on the basis of the updated information;
   (b) performing, by the broadcasting management server, user authentication of the customer terminal and requesting consent to advertising contents when the customer terminal requests transmission of broadcasting contents from the broadcasting management server in order for the broadcasting content to be transmitted;
   (c) transmitting and installing, by the broadcasting management server, a control module which controls a multi-screen of the customer terminal when the customer terminal consents to the advertising contents;
   (d) transmitting, by the broadcasting management server, predetermined screen split setting information to the customer terminal;
   (e) transmitting, by the broadcasting management server, the broadcasting contents for free to the customer terminal;
   (f) selecting, by the advertisement management server, an advertiser with an IP address as a target using the IP address in the target customer information of the customer terminal, and transmitting advertising contents of the selected advertiser to the customer terminal, wherein step (f) comprises the steps of:
   (f-1) receiving, by the broadcasting management server, customer information on the customer terminal and transmitting the target customer information to the advertisement management server when the customer terminal consents to the advertising contents;
   (f-2) selecting, by the advertisement management server, an advertiser with an IP address of the customer terminal as a target from the target customer information within the advertisement management table database; and
   (f-3) transmitting advertising contents of the selected advertiser to a target customer terminal; and
   (g) analyzing, by the control module installed in the customer terminal, the screen split setting information to split an entire screen of the customer terminal into a main screen which is reduced to a size less than that of the original image screen for full screen contents and a sub-screen, and reproducing broadcasting contents on the main screen while simultaneously reproducing advertising contents on the sub-screen, wherein step (g) comprises the steps of;
   (g-1) analyzing, by the control module, values associated with a type of an entire screen, a reproduction time and period of a sub-screen for driving advertising contents, a driving player based on a type of advertising contents added into the sub-screen, and a storage path of advertising contents which are designated in the screen split setting information; and
   (g-2) fetching advertising contents in a real-time streaming type through the storage path, and reproducing the fetched advertising contents on the sub-screen;
   (h) receiving, by the advertisement management server, information on how many times advertising contents has been exposed to the customer terminal from the broadcasting management server, and calculating predetermined advertising costs and transaction fee in accumulated money of an advertiser in proportion to the number of exposures;
   (i) generating and storing a database of the calculated advertising costs and transaction fee information;
   (j) restricting, by the advertisement management server, advertisement exposure when the accumulated money of the advertiser is insufficient;
   (k) requesting advertiser information from the broadcasting management server when advertising contents reproduced by the customer terminal is selected;
   (l) retransmitting, by the broadcasting management server, the predetermined screen split setting information to the customer terminal;

(m) analyzing, by the control module installed in the customer terminal, the retransmitted screen split setting information to re-split the entire screen of the customer terminal into a main screen and a sub-screen; and (n) providing, by the advertisement management server, an advertisement information list screen user interface to the re-split sub-screen, the advertisement information list screen user interface comprising advertising contents, information on an order method, information on a reservation method, or information of a payment method that will be displayed by the customer terminal.

2. The broadcasting service method of claim 1, wherein step (m) comprises the steps of:

(m-1) analyzing, by the control module, values associated with a type of an entire screen, a reproduction time and period of a sub-screen for driving advertising contents, a driving player based on a type of advertising contents added into the sub-screen, and a storage path of advertising contents which are designated in the retransmitted screen split setting information; and (m-2) fetching advertising contents in a real-time streaming type through the storage path, and reproducing the fetched advertising contents on the sub-screen.

3. A broadcasting service system providing pay-per view contents for free according to a viewer's consent to advertisements, the system comprising:

an advertisement management server, configured to perform user authentication, provide a user interface for managing advertising contents to a plurality of advertisers when an advertiser terminal accesses the advertisement management server, wherein the advertisement management server is further configured to:

perform user authentication when the advertiser terminal requests registration of advertising contents in the advertisement management server, perform the user authentication and providing the user interface for managing the advertising contents to register and update basic information of the advertiser, target customer information on a customer who desires an advertisement, and advertising content information suitable for an advertising content type, and generate an advertisement management table database on the basis of the updated information; and a broadcasting management server configured to perform user authentication of a customer terminal, request consent to advertising contents in order for the broadcasting content to be transmitted when the customer terminal requests transmission of broadcasting contents from the broadcasting management server, transmit and install a control module which controls a multi-screen of the customer terminal when the customer terminal consents to the advertising contents, transmit a predetermined screen split setting information to the customer terminal, and transmit broadcasting contents for free to the customer terminal wherein the broadcasting management server is further configured to:

receive the target customer information on the customer terminal and transmitting the customer information to the advertisement management server when the customer terminal consents to the advertising contents, select an advertiser with an IP address of the customer terminal as a target from the target customer information within the advertisement management table database, and transmit advertising contents of the selected advertiser to a target customer terminal, wherein the advertisement management server is configured to select an advertiser with an IP address as a target using the IP address in customer information of the customer terminal, and transmit advertising contents of the selected advertiser to the customer terminal, wherein the advertisement management server is further configured to:

receive the target customer information on the customer terminal and transmitting the customer information to the advertisement management server when the customer terminal consents to the advertising contents, select an advertiser with an IP address of the customer terminal as a target from the customer information on the basis of the advertisement management table database, and transmit advertising contents of the selected advertiser to a target customer terminal, and the control module installed in the customer terminal is configured to analyze the screen split setting information to split an entire screen of the customer terminal into a main screen which is reduced to a size less than that of the original image screen for full screen contents and a sub-screen, and reproduce broadcasting contents on the main screen while simultaneously reproducing advertising contents on the sub-screen, wherein advertiser information from the broadcasting management server is requested when advertising contents reproduced by the customer terminal are selected, the broadcasting management server is configured to retransmit the predetermined screen split setting information to the customer terminal, the control module is configured to analyze the retransmitted screen split setting information to re-split the entire screen of the customer terminal into a main screen and a sub-screen, and the advertisement management server is configured to provide an advertisement information list screen user interface to the re-split sub-screen, the advertisement information list screen user interface comprising advertising contents, information on an order method, information on a reservation method, or information of a payment method that will be displayed by the customer terminal.

4. The broadcasting service system of claim 3, the control module is further configured to:

analyze values associated with a type of an entire screen, a reproduction time and period of a sub-screen for driving advertising contents, a driving player based on a type of advertising contents added into the sub-screen, and a storage path of advertising contents which are designated in the retransmitted screen split setting information; and fetch advertising contents in a real-time streaming type through the storage path, and reproducing the fetched advertising contents on the sub-screen.

* * * * *